United States Patent [19]

Neko

[11] Patent Number: 4,847,023
[45] Date of Patent: Jul. 11, 1989

[54] METHOD FOR CONTROLLING AN INJECTION MOTOR TO PREVENT OVERHEATING

[75] Inventor: Noriaki Neko, Hachioji, Japan

[73] Assignee: Fanuc Ltd., Yamanashi, Japan

[21] Appl. No.: 163,817

[22] PCT Filed: Jun. 23, 1987

[86] PCT No.: PCT/JP87/00413

§ 371 Date: Feb. 26, 1988

§ 102(e) Date: Feb. 26, 1988

[87] PCT Pub. No.: WO88/00123

PCT Pub. Date: Jan. 14, 1988

[30] Foreign Application Priority Data

Jul. 3, 1986 [JP] Japan ................. 61-155174

[51] Int. Cl.$^4$ .............................. B29C 45/76
[52] U.S. Cl. .................. 264/40.1; 364/476; 425/151; 425/166
[58] Field of Search ............. 318/563, 472; 364/149, 364/186, 476; 264/40.1, 40.5, 40.7, 328.1; 425/135, 136, 145, 151, 154, 162, 166

[56] References Cited

U.S. PATENT DOCUMENTS 4,695,237 9/1987 Inaba ................. 425/135
4,696,632 9/1987 Inaba ................. 425/150
4,759,705 7/1988 Otake et al. ......... 425/149

FOREIGN PATENT DOCUMENTS 57-75833 5/1982 Japan .
59-175393 10/1984 Japan .
61-84218 4/1986 Japan .

Primary Examiner—Jan H. Silbaugh
Assistant Examiner—Jill L. Heitbrink
Attorney, Agent, or Firm—Staas & Halsey

[57] ABSTRACT

A method for controlling an injection motor of an injection-molding machine to prevent overheating such that injection-molding conditions to prevent the injection motor from overheating can be set securely. When injection-molding conditions are initially set (S1-S3), the ratio (R) between the integral of the amount of heat, produced by an injection motor driving current for one injection-molding cycle, and the allowable integral of the heat amount obtained when a continuous rated current flow is calculated (S5) before the one injection-molding cycle is executed in accordance with the new set injection-molding conditions. Then, the calculated ratio (R) and an allowable ratio (Rmax) are compared, and it is previously determined (S6) whether an overheating state of the injection motor can be produced when the injection-molding cycle is executed in accordance with the set conditions. If overheating can be produced, a warning is issued (S7).

2 Claims, 3 Drawing Sheets

METHOD FOR CONTROLLING AN INJECTION MOTOR TO PREVENT OVERHEATING

BACKGROUND OF THE INVENTION

1. Field of the Invention

The present invention relates to a control method for an injection motor of an injection-molding machine, and more particularly, to a method for controlling an injection motor having an overheat preventing function, whereby injection-molding conditions are set securely such that the injection motor is prevented from overheating.

2. Description of the Related Art

In an injection-molding machine, as is generally known, a synchronous motor (hereinafter referred to as an injection motor) is used as a drive source for an injection unit. Processes of injection, hold, and application of back pressure for metering are executed by means of the injection motor. In the injection-molding machine of this type, the output torque of the injection motor is small, so that a very small driving current flows through the injection motor, during the injection process or when the back pressure is applied. In the hold process, a great output torque must be produced, so that a very great driving current flows. Meanwhile, the injection motor is selected in consideration of various design conditions, such as economical efficiency. It is uncommon, therefore, to use, as the injection motor, a large-capacity motor such that its continuous rated current is never exceeded by the driving current. As a result, the driving current during the hold process may possibly exceed the continuous rated current by a large margin, so that the average value of the driving current flowing through the injection motor during one injection-molding cycle may sometimes exceed the continuous rated current. In such a case, the injection motor may suffer from overheating or some other problems.

SUMMARY OF THE INVENTION

An object of the present invention is to provide a control method for an injection motor of an injection-molding machine, which solves the aforementioned problems associated with prior art methods of injection motor control wherein the average injection motor driving current exceeded the continuous rated current, thus tending to cause overheating. Thus, an object is to provide a method in which whether the injection motor can overheat before completing the execution of an injection-molding cycle under injection-molding conditions, newly inputted and set, is easily ascertained in advance, thereby preventing the injection motor from overheating.

In order to achieve the above object and other objects of the invention, method for controlling an injection motor to prevent overheating according to the present invention, comprises steps of: previously determining whether an overheating state can be produced such that the integral of the amount of heat, produced by an injection motor driving current for one injection-molding cycle, exceeds the allowable integral of the heat amount obtained when a continuous rated current flows, in accordance with new set values of injection-molding conditions, before executing the injection-molding cycle under the new set injection-molding conditions; and delivering a warning output if it is concluded that the overheating state can be produced.

According to the present invention, as described above, whether the overheating state can be produced such that the integral of the amount of heat, produced by the injection motor driving current for one injection-molding cycle, exceeds the allowable integral of the heat amount obtained when the continuous rated current flows, is previously determined in accordance with set input values of injection-molding conditions before executing the injection-molding cycle under the new set injection-molding conditions; and the warning output is delivered when it is concluded that the overheating state can be produced. Thus, when the injection-molding conditions are inputted for setting, during the execution of the injection-molding cycle or the period of suspension thereof, whether the injection motor can overheat is easily ascertained in advance, so that the injection motor can be prevented from overheating.

DETAILED DESCRIPTION OF THE PREFERRED EMBODIMENTS

Figure 3:
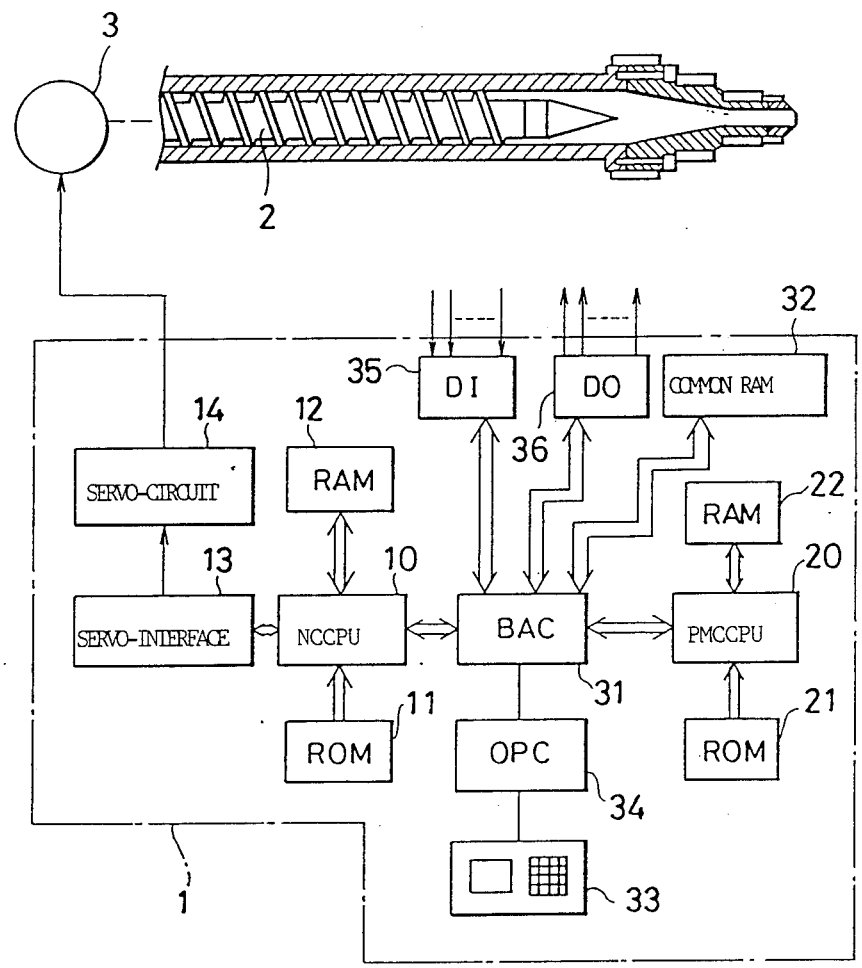
FIG. 3 is a schematic view showing a principal part of an injection-molding machine to which is applied to control method according to the aforesaid embodiment.

FIG. 3 shows a principal part of an injection-molding machine to which is applied on injection motor control method according to the present invention. The injection-molding machine is arranged so that the drive of servomotors, used to drive various axes for injection, clamping, screw rotation, and ejector operation, and various actuators (among which only an injection motor 3 for driving a screw 2 in an injecting direction is shown) is controlled by means of a numerical control unit (hereinafter referred to as NC unit) 1 having a built-in computer. The NC unit 1 includes a microprocessor (hereinafter referred to as NCCPU) 10 for numerical control and a microprocessor (hereinafter referred to as PMCCPU) 20 for programmable machine controller.

The NCCPU 10 is connected with a ROM 11, which stores a control program for generally controlling the injection-molding machine, and a RAM 12 for tentatively storing data during various arithmetic processes. The NCCPU 10 is also connected with servo-circuits for the various axes (among which only a servo-circuit 14 for the injection motor 3 is shown) through a servo-interface 13. On the other hand, the PMCCPU 20 is connected with a ROM 21, which stores a sequence program for the injection-molding machine or the like, and a RAM 22 for tentatively storing the result of arithmetic operations. The ROM 21 stores previously entered data including the minimum dry cycle time DT, pressure MP produced when the injection motor 3 delivers its maximum torque output, predetermined allowable ratio Rmax, and warning and permission messages.

A bus-arbiter controller 31 is connected to both of the CPUs 10 and 20 by means of buses. The bus-arbiter controller 31 is connected with a nonvolatile common RAM 32 for storing various control programs for the control of the injection-molding machine, an operator panel controller OPC 34 connected with an MDI/CRT 33, an input circuit DI 35, and an output circuit DO 36, by means of buses. Various actuators (not shown) and the like are connected to the circuits 35 and 36.

The NC unit 1 is designed so that when an operator operates a control panel of the MDI/CRT 33 to input various molding conditions in succession, after operating setting keys (not shown), formed of soft keys on the MDI/CRT 33, to make a display on a screen for setting the molding conditions, the set values are stored in a first predetermined memory region of the common RAM. Also, the NC unit 1 is arranged so that when the operator operates a register key of the MDI/CRT 33, the set molding conditions stored in the first predetermined memory region of the common RAM 32 are held therein, and are transferred to a second predetermined memory region of the common RAM 32 to be stored therein. The injection-molding machine executes an injection-molding cycle in accordance with the set molding conditions stored in this manner.

Figure 1:
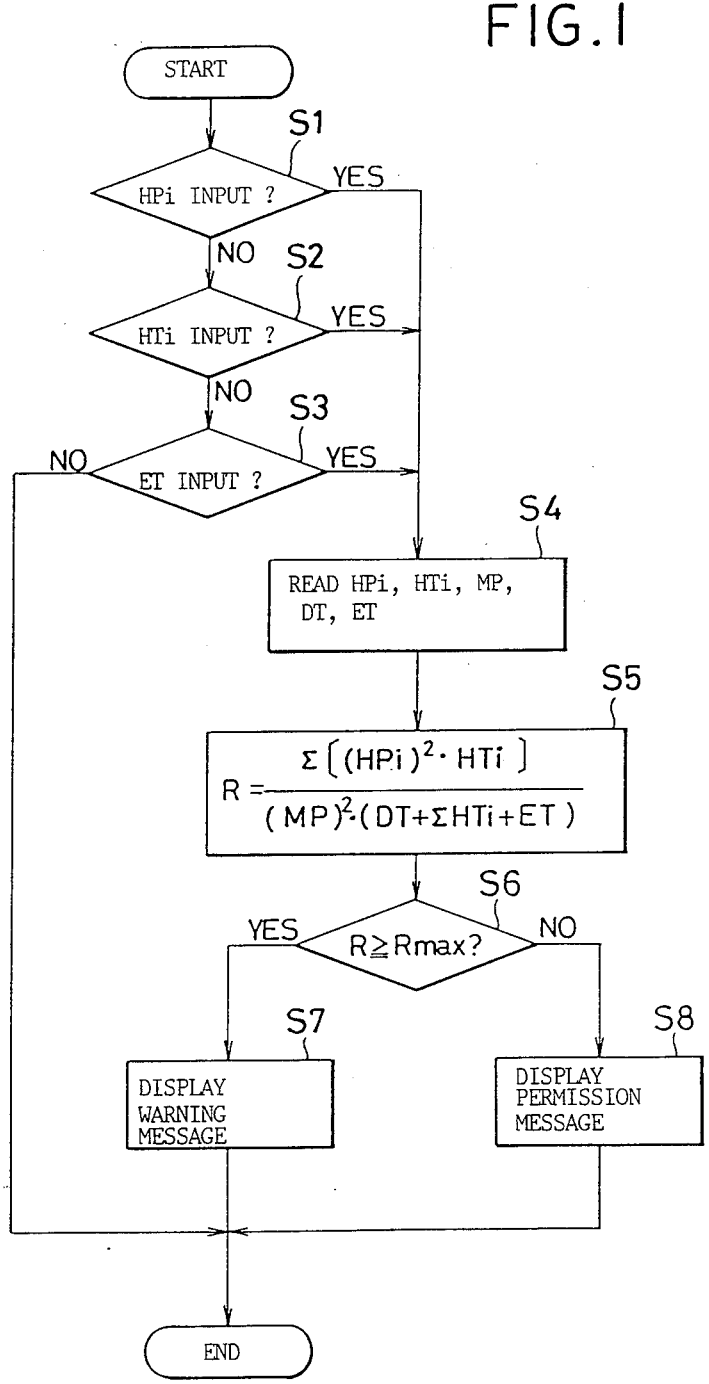
FIG. 1 is a flow chart of a control program for effecting an injection motor control method according to an embodiment of the present invention.
Figure 2:
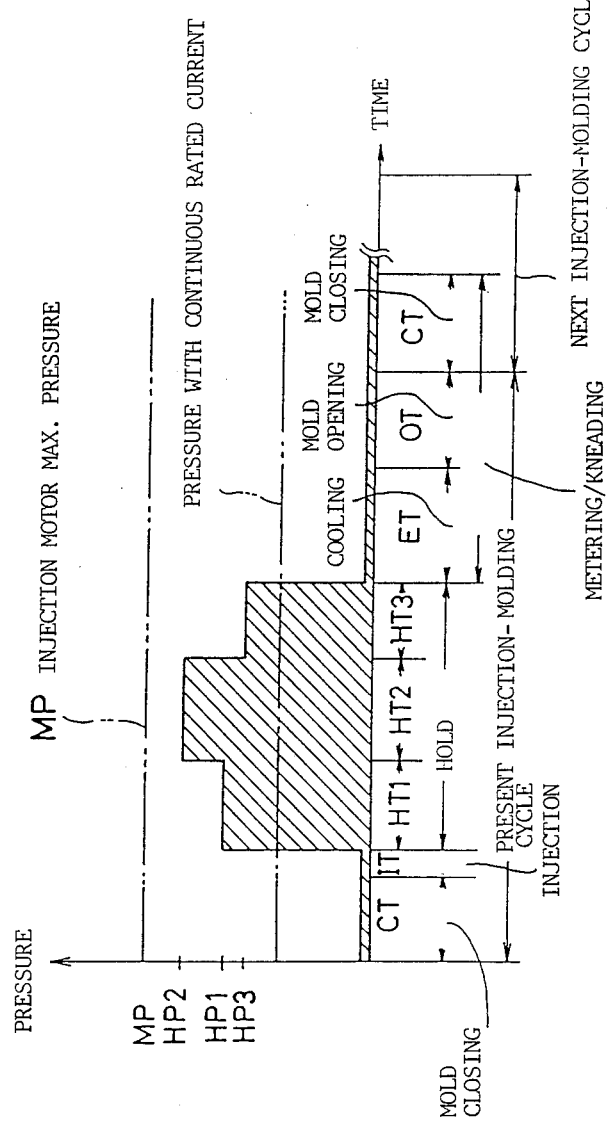
FIG. 2 is a diagram for illustrating the concept of injection motor control according to the aforesaid embodiment.

Referring now to FIGS. 1 and 2, injection motor control executed by means of the injection-molding machine with the aforementioned construction will be described.

Referring first to FIG. 2, the concept of injection motor control according to one embodiment of the present invention will be described. It will be assumed that injection, hold, and metering/kneading operations are performed by means of an injection unit having the injection motor 3 as its drive source. Also, a mold opening operation is performed by means of a mold clamping unit (not shown) of the injection-molding machine, following mold closing operation by the mold clamping unit. In this case, a very small driving current flows through the injection motor 3 during the injection and metering/kneading processes, while a very great driving current flows during the hold process, as shown in FIG. 2. Thus, the integral of the amount of heat, produced by the driving current flowing through the injection motor 3 during one injection-molding cycle, can be approximated by means of the integral of the amount of heat produced by the driving current flow during the hold process. Also, the value of the driving current flow during the hold process can be approximated by means of a set hold pressure HPi (i=1−3). Since the heat amount is proportional to the square of current, the integral of the heat amount for one cycle can be obtained by integrating the square of the set hold pressure HPi with respect to a set hold time HTi.

Meanwhile, the continuous rated current of the injection motor 3 is equal to the product of the driving current obtained with the maximum torque output and the proportional constant, and the motor driving current is proportional to the motor output torque. Accordingly, the continuous rated current is proportional to the pressure MP produced when the maximum torque output is delivered.

The injection-molding cycle time, i.e., the sum total of the mold closing time CT, injection time IT, sum ΣHTi of set hold times, set cooling time ET, and mold opening time OT never exceeds a value (DT+ΣHTi+ET). Here DT indicates the minimum dry cycle time, i.e., the minimum value of the sum of the mold closing time CT and the mold opening time OT when these times depend on the mechanical arrangement of the injection-molding machine. The injection time takes a value much smaller than those of other time parameters, such as CT.

In conclusion, the amount of heat produced by the flow of a driving current equivalent to the continuous rated current for one injection-molding cycle can be approximated, with a margin of safety, by means of a value which is obtained by multiplying the square of the product of the proportional constant and the pressure MP, produced when the injection motor 3 delivers its maximum torque output, by the sum total of the sum ΣHTi of the set hold times, the set cooling time ET, and the minimum dry cycle time DT.

The present invention is characterized in that whether the injection motor 3 may possibly overheat, when the motor is operated under injection-molding conditions to be newly set, is previously determined in the following manner, in consideration of the aforementioned circumstances. More specifically, whether the integral of the amount of heat produced by the driving current for one injection-molding cycle exceeds the allowable integral of the heat amount obtained when the continuous rated current flows is determined. Based on this decision, the sum total $\Sigma\{(HPi)^2 \cdot HTi\}$ of the products of the set hold times HTi and the squares of the set hold pressures HPi, for individual hold steps of the injection-molding cycle, and the product $(MP)^2 \cdot (DT+\Sigma HTi+ET)$ of the square of the pressure MP, produced when the injection motor 3 delivers its maximum torque output, and the sum of the sum ΣHTi of the set hold times, the set cooling time ET, and the minimum dry cycle time DT are obtained. Then, whether the ratio R $(=[\Sigma\{(HPi)^2 \cdot HTi\}]/[(MP)^2 \cdot (DT+\Sigma HTi+ET)])$ between these two resulting values exceeds the predetermined allowable ratio Rmax is determined.

FIG. 1 shows an overheat prevention control program which is executed by the PMCCPU 20 for the injection motor control according to the one embodiment of the present invention. This program is executed periodically when the operator operates the setting keys of the MDI/CRT 33 to establish an injection condition setting mode, for example, thereby making a display on the molding condition setting screen.

In the injection-molding condition setting mode, during the execution of the injection-molding cycle or the period of suspension thereof, the CPU 20 monitors the operating condition of the control panel of the MDI/CRT 33, and determines whether an input operation is accomplished to newly set or change either the cooling time or the hold pressure and the hold time for each hold step of the injection-molding cycle (Step S1 to Step S3). More specifically, whether any of the set values HPi (i=1−3) of the hold pressure is inputted is determined first (Step S1). If there is no such input, whether any of the set values HTi of the hold time has been inputted is determined (Step S2). If there is no such input either, whether the set value ET of the cooling time is inputted is determined (Step S3). If there is no input for any of the injection-molding conditions, the present program is finished.

Meanwhile, if the operator inputs the set value of one molding condition by operating the control panel of the MDI/CRT 33, the PMCCPU 20 renews only that set value, among other memory contents of the first predetermined memory region of the common RAM 32, in accordance with a control program (not shown), and detects such input operation in Steps S1 to S3 of the present program. When the input operation is detected, the present program proceeds to Step S4, whereupon the CPU 20 reads out the set hold pressure HPi, the set hold time HTi, and the set cooling time ET from the first predetermined memory region of the common RAM 32, and also reads out the minimum dry cycle time DT, the maximum pressure MP produced, and the predetemrined allowable ratio Rmax from the ROM 21 on the side of the PMCCPU 20.

Subsequently, in Step S5, the ratio R ($=[\Sigma\{(HPi)^2 \cdot HTi\}]/[(MP)^2 \cdot (DT+\Sigma HTi+ET)]$) between the sum total of the products of the set hold times and the squares of the set hold pressures and the product of the square of the pressure produced when the injection motor 3 delivers its maximum torque output and the sum of the minimum dry cycle time, the sum of the set hold times, and the set cooling time is calculated. Then, the CPU 20 determines whether the ratio R, calculated in this manner, exceeds the predetermined allowable ratio Rmax (Step S6). If the calculated ratio R exceeds the predetermined allowable ratio Rmax, that is, if the operation of the injection motor 3 under the molding conditions to be set anew is likely to overheat the motor, the CPU 20 causes a warning message, such as "FEAR OF INJECTION MOTOR OVERHEATING" or the like, previously stored in the ROM 21, to be displayed as a warning output on a predetermined region of the molding condition setting screen, for example (Step S7). Thus, the present program is finished. If it is concluded in Step S6, on the other hand, that the calculated ratio R is not higher than the allowable ratio Rmax, the CPU 20 causes a permission message, such as "NO FEAR OF INJECTION MOTOR OVERHEATING" or the like, stored in like manner, to be displayed (Step S8), whereupon the present program ends.

Thus, every time the operator inputs the set value of one molding condition, the ratio R is calculated, and whether the molding conditions to be newly set are permissible in the operation of the injection motor 3 is displayed. After inputting all the set values to be newly set, the operator checks to see if a warning message is displayed, lest improper injection-molding conditions be set carelessly. If a warning message is displayed, the set values of the hold pressure and the hold time are changed into smaller ones, or the set value of the cooling time is changed into a greater one. Therafter, whether the warning message is still displayed is ascertained, and the changing of the set values is continued until the display ceases. When the set conditions are rationalized, the aforesaid permission message is displayed in place of the warning message. When the operator operates the register key of the MDI/CRT 33 after ascertaining this, the set molding conditions stored in the first predetermined memory region of the common RAM 32 are transferred to the second predetermined memory region of the common RAM 32 to be stored therein. In accordance with the new set conditions stored in this manner, a proper injection-molding cycle is executed without overheating the injection motor 3. The process of Step S8 may alternatively be arranged only so that the warning message is erased.

What is claimed is:

1. A method for controlling an injection motor driven by a driving current, to prevent overheating, comprising the steps of:
    determining an integral of the amount of the heat produced by the driving current for an injection-molding cycle for a given set of process parameters before the injection-molding cycle is executed;
    determining a maximum allowable integral of the amount of heat produced when a continuous rated current flows in the injection motor;
    comparing the integral determined by the driving current to the maximum allowable integral determined by the continuous rated current to determine whether a possibility of an overheating state exist based on the maximum allowable integral being exceeded by the integral determined by the driving current; and
    producing a warning output when the possibility of an overheating state exists.

2. A method for controlling an injection motor according to claim 1, further comprising the step of changing at least one of the process parameters setting a second set of process parameters and re-determining the integral of heat produced by an injection motor driving current for the injection-molding cycle and for the second set of process parameters.

* * * * *